May 19, 1959  J. L. PIERSOL  2,887,431
METHOD OF FORMING A SLURRY OF DIFFERENT FILLER
PARTICLES UNIFORMLY COATED WITH A BINDER
Filed Jan. 11, 1957
*Fig. 1*
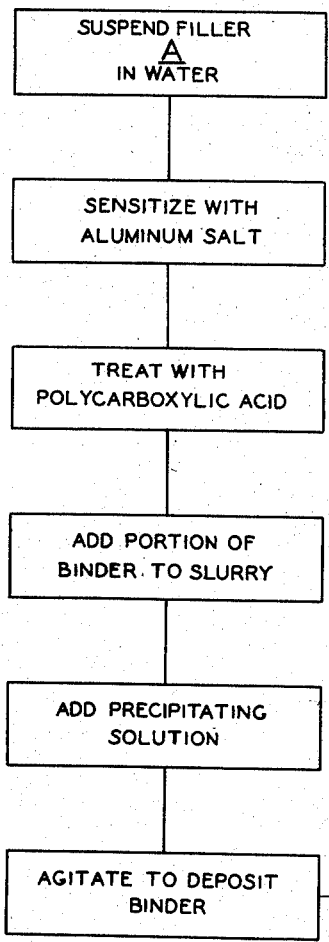
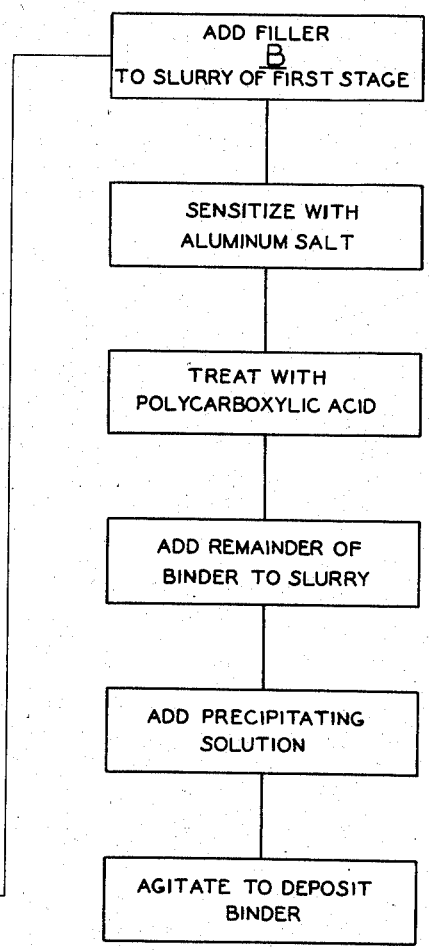
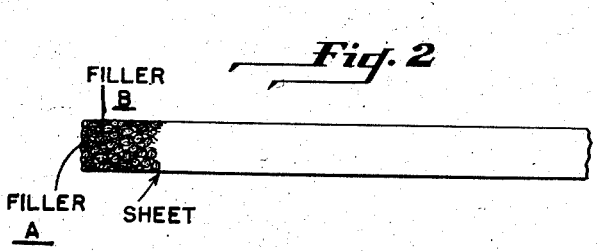
*Fig. 2*
INVENTOR
JAY L. PIERSOL
ATTORNEY

2,887,431
METHOD OF FORMING A SLURRY OF DIFFERENT FILLER PARTICLES UNIFORMLY COATED WITH A BINDER

Jay L. Piersol, Lancaster, Pa., assignor to Armstrong Cork Company, Lancaster, Pa., a corporation of Pennsylvania Application January 11, 1957, Serial No. 633,714

15 Claims. (Cl. 162—169)

This invention relates to a method of depositing a binder onto two or more classes or kinds of filler particles suspended in an aqueous slurry to obtain a more uniform deposit of the binder on all of the particles.

The process of the invention is particularly suited for use in the preparation of sheet materials from a mixture of ground rubber foam and kraft paper fibers bonded with a synthetic rubber binder. The invention is of general application, however, as will be clear from the following detailed description of typical embodiments of the invention.

In the formation of a sheet composed of a mixture of ground rubber foam and kraft paper fibers, with a rubber binder, using a so-called beater saturation process and the alum-ammonia precipitation system of Pretzel Patent 2,375,245 or the alum-citrate process of my copending application Serial No. 494,799, filed March 16, 1955, now Patent 2,843,479, the rubber binder is deposited principally on the fibers, and the particles of ground rubber foam are not as well or as uniformly coated as desired. As a result, the stock when formed on a Fourdrinier wire, for example, pressed, and dried is not uniformly bound. The kraft fibers appear to be more receptive to deposit of the rubber latex binder than the particles of rubber sponge. This preferential acceptance of the binder is not unique with a mixture of particles of rubber sponge and kraft fibers. It is also present in slurries of cork and kraft fibers, wool and cotton fiber slurries, and to a somewhat lesser but nevertheless important extent in combined fillers of the same class but different kind such as a mixture of substantially unrefined wood pulp and other cellulose fibers such as sulfite or sulfate pulp. These will be referred to herein as filler particles of different classifications, i.e., one having a lesser affinity for the binder than the other or others.

According to the present invention, the filler particles which have the lesser affinity for the binder to be deposited from an aqueous dispersion are formed into an aqueous slurry, and a portion of the binder is deposited upon them. Then, the other filler particles are added to the slurry, and the remainder of the binder is deposited onto all of the filler particles in the slurry; but since some of the particles are preferentially receptive to deposit of the binder, these will accept more of the binder. Thus, by controlling the amount of binder added to the slurry in the two stages, a much more uniform deposit of the binder on all of the filler particles will be achieved.

The following example illustrates practice of the invention, utilizing an alum-citrate treatment.

Example 1

First stage:

| | |
|---|---|
| Ground rubber foam (50/200 mesh) | 40.00 grams. |
| Water | 4.50 liters. |
| Alum | 1.30 grams. |
| Sodium citrate | 0.87 gram. |
| Dispersing agent (Tamol N—10% solution) | 1.20 cc. |
| Butadiene-styrene latex (GRS 2000—40% solids) | 15.00 grams (wet). |
| Precipitating solution (A—below) | 35.00 cc. |

Second stage—Add to precipitated slurry of the first stage:

| | |
|---|---|
| Sodium citrate | 0.75 gram. |
| Dispersing agent (Tamol N—10% solution) | 3.75 cc. |
| Water | 3.00 liters. |
| Kraft fiber (Latuque) | 20.00 grams. |
| Butadiene-styrene latex (GRS 2000—40% solids) | 37.50 grams (wet). |
| Precipitating solution (A—below) | 30.00 cc. |

Precipitating solution—A:

| | Grams |
|---|---|
| Alum | 4.00 |
| Acetic acid | 4.50 |
| Water | 40.00 |

Tamol N is a dispersing agent for the synthetic rubber latex. It is a sodium salt of a naphthalene sulfonic acid condensed with an aldehyde.

In the preparation of a sheet suitable for use as a facing for bulletin or tack boards, the ground rubber form which may be scrap natural rubber foam from foam rubber mattress and pillow manufacture, for instance, is slurried in water and is sensitized with alum. Any excess aluminum ions which may be present in the sensitized slurry are removed therefrom by the addition of sodium citrate. The rubber latex is then added to the sensitized and treated slurry and uniformly distributed therethrough. The precipitating solution is added, and the slurry is agitated to deposit the rubber latex onto the ground rubber foam. This completes the first stage of the process.

In the second stage of the process, the kraft fibers and additional water are added to the acid slurry of the first stage which contains the particles of rubber foam coated with the deposited rubber latex binder. Any excess aluminum ions resulting from the addition of the precipitation solution to the slurry in the first stage and not required to sensitize the added kraft fibers are then removed by the addition of sodium citrate to the second stage slurry. The additional rubber latex is added next and distributed throughout the slurry, followed by addition of the precipitating solution. The slurry is agitated to deposit the rubber latex onto the filler particles. There is believed to be a preferential deposit of the rubber binder in this second stage onto the kraft fibers, with a lesser deposit onto the particles of rubber foam. The reason for this is not fully understood. It is probable that the extensive surface area presented by the kraft fibers and the fine hair-like projections on the fibers have an effect on the deposition. There may also be some electrical (surface change) phenomenon or chemical action involved. The end result of the two-stage process is clear, however all of the filler particles are well coated with the binder.

The binder-coated particles may then be delivered as a slurry to a conventional paper machine of the Fourdrinier type, for instance, and a sheet may be formed therefrom. The finished sheet will be found to have a more even distribution of the binder over all of the filler particles, both the rubber foam particles and the kraft fibers, than would be accomplished were the binder deposited simultaneously onto a mixture of these fillers in an aqueous slurry.

The alum-citrate process described above is more fully set forth in my Patent 2,843,479, referred to above, which is incorporated herein by reference for a more complete description of the process, the sensitizing and treating agents and precipitating solutions which may be used, the preferred working proportions of the various ingredients, and other details with which the present application is not specifically concerned.

The following example illustrates the method of the invention as applied to a sheet for gasketing uses, for example, including both cork particles and kraft fibers as filler particles.

Example II

First stage:
- Ground cork (40/90 mesh) _____ 45.00 grams.
- Water _____ 5.50 liters.
- Alum _____ 0.75 gram.
- Sodium citrate (10% solution) __ 10.00 cc.
- Butadiene-styrene latex (GRS 2001—38% solids) _____ 35.50 grams (wet).
- Carboxymethyl cellulose _____ 0.27 gram.
- Precipitating solution (A—above) 15.00 cc.

Second stage—Add to precipitated slurry of the first stage:
- Sodium citrate (10% solution) _ 10.00 cc.
- Carboxymethyl cellulose _____ 0.25 gram.
- Water _____ 1.90 liters.
- Kraft fiber _____ 15.00 grams.
- Butadiene-styrene latex (GRS 2001—38% solids) _____ 11.80 grams (wet).
- Precipitating solution (A—above) _____ 10.00 cc.

In a slurry of cork particles and kraft fibers, the kraft fibers will have a greater affinity for a butadiene-styrene rubber latex. Therefore, in the first stage in Example II, as in Example I, the filler particles having the lesser affinity, in this instance the cork particles, are treated first; and after they have been coated with the desired quantity of the binder, the remaining filler particles, the kraft fiber in this example, are added, and the desired additional quantity of binder is then deposited, preferentially, it is believed, onto these kraft fiber particles and onto the cork particles.

The procedure to be followed in this example is the same as in Example I. Where a sheet is to be formed from the slurry, a paper machine may be employed. The slurry may also be dewatered, molded to shape, dried, and cured in the fabrication of other products, especially where cork is the predominant filler and molded cork composition products are to be made.

The following example illustrates the process of the invention using an alum-ammonia precipitation process.

Example III

First stage:
- Ground rubber foam (50/200 mesh) _____ 20.00 grams.
- Water _____ 2.00 liters.
- Alum _____ 2.75 grams.
- Ammonia (NH$_4$OH) _____ 2.00 cc.
- Dispersing agent (Tamol N— 10% solution) _____ 0.75 cc.
- Butadiene-styrene latex (GRS 2000—40% solids) _____ 7.50 grams (wet).

Second stage—Add to precipitated slurry of the first stage:
- Kraft fiber (Latuque) _____ 10.00 grams.
- Water _____ 1.75 liters.
- Alum _____ 3.50 grams.
- Ammonia (NH$_4$OH) _____ 3.00 cc.
- Butadiene-styrene latex (GRS 2000—40% solids) _____ 26.10 grams (wet).
- Dispersing agent (Tamol N— 10% solution) _____ 3.00 cc.

In the preparation of a sheet product using the composition of Example III, the ground rubber foam is dispersed in the water and the alum is added. The ammonium hydroxide is then mixed in. This converts the metal salt (aluminum sulfate) to metal hydroxide. Then the binder (GRS) containing the Tamol N is added with agitation. The solids content of the latex is deposited onto the ground rubber foam as a substantially uniform coating.

This is an alum-ammonia precipitation process and is disclosed in Pretzel Patent 2,375,245 and Baymiller Patent 2,720,476 to which reference is made for additional details of the process.

This precipitated slurry forms the basis for the second stage of the process in which the kraft fiber and the water are added to the precipitated furnish and treated with alum. This is followed by the addition of the ammonium hydroxide and then the GRS latex containing the Tamol N. The slurry is agitated and the latex is deposited onto the filler particles, producing a slurry in which both the ground rubber foam particles and the kraft fiber particles are both well coated with the binder. The slurry may be delivered to a paper machine, such as a Fourdrinier, and a sheet of the desired thickness produced. The sheet product may then be pressed or calendered to the desired density and may be dried and trimmed to the desired width. The final product will comprise a predominant volume of ground rubber foam with a minor amount by volume of reinforcing kraft fibers, the whole being bonded into a unitary structure by the synthetic rubber binder. The ground rubber foam will be well rooted into the body of the sheet.

The following example illustrates the method applied to a combination of particles of reground cork composition and kraft fiber utilizing an alum-ammonia precipitation procedure, as in Example III above. The same general procedure may be followed with Example IV below as outlined above for Example III.

Example IV

First stage:
- Reground cork composition (40/90 mesh) _____ 20.00 grams.
- Water _____ 2.00 liters.
- Alum _____ 2.75 grams.
- Dispersing agent (Tamol N— 10% solution) _____ 1.00 cc.
- Ammonia (NH$_4$OH) _____ 2.00 cc.
- Butadine-styrene latex (GRS 2000—40% solids) _____ 10.00 grams (wet).

Second stage—Add to precipitated slurry of first stage:
- Kraft fiber (Latuque) _____ 10.00 grams.
- Water _____ 1.75 liters.
- Alum _____ 4.50 grams.
- Dispersing agent (Tamol N— 10% solution) _____ 2.30 cc.
- Ammonia (NH$_4$OH) _____ 3.00 cc.
- Butadine-styrene latex (GRS 2000—40% solids) _____ 20.00 grams (wet).

In the attached drawing:

Figure 1 is a flow diagram illustrating the process of the invention, using the alum-citrate precipitation process; and Figure 2 is a diagrammatic view of a section of a finished sheet produced by the process.

In Figure 2, the filler particles A, the filler particles B, and the sheet as a whole have been identified by legends.

While the invention has been described with particular reference to natural cork particles, ground rubber foam particles, particles of reground cork composition, and kraft paper fibers, as noted above, the invention is not limited thereto but is of general application where a mixed filler is used and the binder when deposited from an aqueous suspending medium has greater affinity for one of the fillers than the other or others. Typical of other fillers which may be used are wood flour, natural and synthetic fibers, clay, wool, and mixtures of various fillers.

The particular binder precipitation technique followed in practicing the invention is not critical as evidenced by the examples given above where both the alum-citrate process and the alum-ammonia process have been disclosed. There is no reason why the first stage of the process could not be carried out by the alum-citrate process and the second stage by the alum-ammonia process. For example, with a filler of wool and cellulose fibers, it might be desirable to use the alum-citrate process in the first stage with the wool fibers, for they are difficult to coat with a synthetic rubber binder, and then use the alum-ammonia process in the second stage with the added cellulose filler which is much more readily coated with the binder.

The invention is applicable to all sorts of binders in addition to the synthetic rubber recited above. Other binders which are substantially insoluble in water may be substituted in whole or in part. Any of the synthetic rubbers, such as butadiene-styrene, butadiene-acrylonitrile, and neoprene, may be used. The various phenol-formaldehyde resins and any of the resinous materials formed through unsaturated linkages such as the vinyl resins may be employed. Not only synthetic resinous materials but also natural resinous materials are contemplated, including coal tar by-products, petroleum by-products, as well as other thermosetting and thermoplastic resinous or rubbery materials, including natural rubber. The binder may be in the form of a dispersion of finely ground material as in the case of the artificial resinous materials or may be in emulsion form as in asphalt emulsion. Mixtures of various binder components may be used.

The quantity of binder added to the filler may be varied over a wide range. In the examples, the ratio of binder on a dry solids basis to total filler, both components A and B, is in the order of 1:3 to 1:2. With the present process, it is possible to add larger quantities of binder to mixed filler particles, particularly where one or more is ordinarily more difficult to coat uniformly by deposit from an aqueous slurry than another or others of the fillers.

The ratio of the quantities of the filler components (A and B in the above examples, for instance) may be varied over a wide range. The invention obviously is of most advantage where there are substantial portions of each of two or more filler components of different affinities for the selected binder. Even where the filler which is difficult to coat with the binder constitutes as little as 10% of the total weight of the filler in the product, there is a definite advantage in employing the present process. For example, with a cork and fiber sheet having 90% cellulose fiber and 10% of cork particles, by weight, the cork particles will be bonded into the sheet better if the present invention is practiced that if a conventional single precipitation procedure be followed.

I claim:

1. In a method of coating with a binder filler particles of at least two different classifications, one having a lesser affinity for a water-insoluble binder when precipitated thereon from an aqueous slurry than the other, the steps comprising: in the first stage, suspending in an aqueous medium filler particles of the classification which has the lesser affinity for the binder, a dispersion of water-insoluble binder, and a precipitating agent for the binder, and agitating said slurry to deposit said binder onto said filler particles; and, in the second stage, after deposit of said water-insoluble binder onto said filler particles suspending, in said slurry of binder-coated filler particles of said first stage the other filler particles which are of the classification which has the greater affinity for the binder, together with an additional quantity of a dispersion of water-insoluble binder and a precipitating agent for said binder, and again agitating said slurry to deposit said additional binder onto said filler particles.

2. The method of claim 1 wherein the binder comprises synthetic rubber latex.

3. In a method of coating with a binder filler particles of at least two different classifications, one having a lesser affinity for a water-insoluble binder when precipitated thereon from an aqueous slurry than the other which is fibrous, the steps comprising: in the first stage, suspending in an aqueous medium filler particles of the classification which has the lesser affinity for the binder, a dispersion of water-insoluble binder, and a precipitating agent for the binder, and agitating said slurry to deposit said binder onto said filler particles; and, in the second stage, after deposit of said water-insoluble binder onto said filler particles, suspending in said slurry of binder-coated filler particles of said first stage the fibrous filler particles which are of the classification which has the greater affinity for the binder, together with an additional quantity of a dispersion of water-insoluble binder and a precipitating agent for said binder, and again agitating said slurry to deposit said additional binder onto said fibrous filler particles.

4. In a method of coating with a binder a mass of filler particles including two different classifications, one of which is fibrous and one of which is nonfibrous and has a lesser affinity for a water-insoluble binder when precipitated thereon from an aqueous slurry than the other, the steps comprising: in the first stage, suspending in an aqueous medium the nonfibrous filler particles of the classification which has the lesser affinity for the binder, a dispersion of water-insoluble binder, and a precipitating agent for the binder, and agitating said slurry to deposit said binder onto said nonfibrous filler particles; and, in the second stage, after deposit of said water-insoluble binder onto said nonfibrous filler particles, suspending in said slurry of binder-coated nonfibrous filler particles of said first stage the fibrous filler particles which are of the classification which has the greater affinity for the binder, together with an additional quantity of a dispersion of water-insoluble binder and a precipitating agent for said binder, and again agitating said slurry to deposit said additional binder onto said filler particles.

5. The method of claim 4 wherein the fibrous filler comprises cellulose fibers.

6. The method of claim 4 wherein the nonfibrous filler comprises foam rubber particles.

7. The method of claim 4 wherein the nonfibrous filler comprises cork particles.

8. The method of claim 4 wherein the fibrous filler comprises kraft fibers and the nonfibrous filler comprises foam rubber particles.

9. The method of claim 4 wherein the fibrous filler comprises cellulose fibers and the nonfibrous filler comprises cork particles.

10. In a method of coating with a binder filler particles including two different classifications, one of which has a lesser affinity for a water-insoluble binder when precipitated thereon from an aqueous slurry than the other, the steps comprising: in the first stage, suspending said filler particles of the classification which has the lesser affinity for the binder in an aqueous medium having dissolved therein a water-soluble salt supplying trivalent aluminum ions, thereafter removing any substantial excess of aluminum ions which may be present by adding to said slurry of sensitized fibers at least one compound of the group consisting of water-soluble polycarboxylic acids and water-soluble salts thereof, adding to said slurry a dispersion of water-insoluble binder material and a precipitating agent for the binder, and agitating said slurry to deposit said binder onto said filler particles; and, in the second stage, after deposit of said water-insoluble binder onto said filler particles, suspending in said slurry of binder-coated filler particles of said first stage the other filler particles which are of the classification which has the greater affinity for the binder, together with an additional quantity of a dispersion of water-insoluble binder and a precipitating agent for said binder, and again agitating said slurry to deposit said additional binder onto said filler particles.

11. The method of claim 10 wherein the precipitating agent for the first stage is a water-soluble aluminum salt supplying trivalent aluminum ions and a water-soluble monocarboxylic acid.

12. The method of claim 10 wherein the precipitating agent for the first and second stages is a water-soluble aluminum salt supplying trivalent aluminum ions and a water-soluble monocarboxylic acid.

13. In a method of coating with a binder filler particles including two different classifications, one of which has a lesser affinity for a water-insoluble binder when precipitated thereon from an aqueous slurry than the other, the steps comprising: in the first stage, suspending the difficultly coatable filler particles in an aqueous medium with alum, adding ammonium hydroxide to the slurry, dispersing said binder in said slurry and depositing it upon said filler particles by agitation of said slurry; and, in the second stage, after deposit of said water-insoluble binder onto said filler particles suspending in said slurry of binder-coated filler particles of said first stage the more readily coatable filler particles, together with an additional quantity of a dispersion of water-insoluble binder and a precipitating agent therefor, and again agitating said slurry to deposit said additional binder onto said filler particles.

14. The method of claim 13 wherein the precipitating agent for the second stage is alum and ammonium hydroxide.

15. In a method of coating with a binder filler particles including cellulose fibers and particles selected from the group consisting of foam rubber, cork, wool, and mixtures thereof, said cellulose fibers having a greater affinity for a water-insoluble binder when precipitated thereon from an aqueous slurry than the other particles, the steps comprising: in the first stage, suspending said filler particles of the classification which has the lesser affinity for the binder in an aqueous medium having alum dissolved therein, thereafter removing any substantial excess of aluminum ions which may be present by adding to said slurry of sensitized fibers sodium citrate, adding to said slurry a dispersion of water-insoluble binder material and a precipitating agent for the binder, and agitating said slurry to deposit said binder onto said filler particles; and, in the second stage, after deposit of said water-insoluble binder onto said filler particles, suspending in said slurry of said binder-coated filler particles of said first stage the cellulose fiber particles which are of the classification which has the greater affinity for the binder, thereafter removing any substantial excess of aluminum ions which may be present in said slurry by adding sodium citrate to said slurry, adding to said slurry an additional quantity of a dispersion of water-insoluble binder and a precipitating agent for said binder, and again agitating said slurry to deposit said additional binder onto said filler particles.

References Cited in the file of this patent
UNITED STATES PATENTS

| | | |
|---|---|---|
| 2,375,245 | Pretzel | May 8, 1945 |
| 2,613,190 | Fiegley | Oct. 7, 1952 |
| 2,666,699 | McQuiston | Jan. 19, 1954 |